United States Patent
Aubin et al.

(10) Patent No.: US 12,229,242 B2
(45) Date of Patent: Feb. 18, 2025

(54) SECURING ACCESS TO PRIVILEGED FUNCTIONALITY IN RUN-TIME MODE ON REMOTE TERMINAL UNIT

(71) Applicant: Schneider Electric Systems, USA Inc., Foxborough, MA (US)

(72) Inventors: Philip Aubin, Kanata (CA); Salih Utku Karaaslan, Ottawa (CA)

(73) Assignee: SCHNEIDER ELECTRIC SYSTEMS USA, INC., Foxboro, MA (US)

(*) Notice: Subject to any disclaimer, the term of this patent is extended or adjusted under 35 U.S.C. 154(b) by 377 days.

(21) Appl. No.: 17/557,364

(22) Filed: Dec. 21, 2021

(65) Prior Publication Data

US 2023/0129749 A1    Apr. 27, 2023

Related U.S. Application Data

(60) Provisional application No. 63/271,863, filed on Oct. 26, 2021.

(51) Int. Cl.

| | |
|---|---|
| *G06F 21/00* | (2013.01) |
| *G06F 3/14* | (2006.01) |
| *G06F 9/54* | (2006.01) |
| *G06F 21/44* | (2013.01) |
| *G06F 21/64* | (2013.01) |

(52) U.S. Cl.
CPC ............ *G06F 21/44* (2013.01); *G06F 3/1454* (2013.01); *G06F 9/545* (2013.01); *G06F 21/64* (2013.01)

(58) Field of Classification Search
CPC ........ G06F 3/1454; G06F 9/545; G06F 21/44; G06F 21/64
See application file for complete search history.

(56) References Cited

U.S. PATENT DOCUMENTS

| | | | |
|---|---|---|---|
| 7,197,516 B1* | 3/2007 | Hipp | G06F 16/10 |
| 2004/0025052 A1* | 2/2004 | Dickenson | H04L 63/105 |
| | | | 726/4 |
| 2010/0050250 A1* | 2/2010 | Ueda | G06F 21/10 |
| | | | 726/17 |
| 2021/0026983 A1* | 1/2021 | Lee | G06F 21/74 |
| 2021/0224377 A1* | 7/2021 | Aschauer | G06F 21/85 |

\* cited by examiner

*Primary Examiner* — Rodman Alexander Mahmoudi
(74) *Attorney, Agent, or Firm* — Stinson LLP

(57) ABSTRACT

A mode selector permits deactivating a run-time operational mode and activating a privileged operational mode on a remote terminal unit (RTU). One or more functionalities associated with the privileged operational mode are performed via a local and/or a remote computing device communicatively coupled to the RTU. The functionalities include at least one of developing and deploying content for the RTU, loading security certificates for the RTU, enabling Linux root account access to the RTU, and performing system maintenance on the RTU. The mode selector switch returns the RTU to the run-time operational mode after the functionalities are performed.

18 Claims, 3 Drawing Sheets

SECURING ACCESS TO PRIVILEGED FUNCTIONALITY IN RUN-TIME MODE ON REMOTE TERMINAL UNIT

CROSS-REFERENCE TO RELATED APPLICATION

This application claims priority from U.S. Provisional Patent Application No. 63/271,863, filed Oct. 26, 2021, the entire disclosure of which is incorporated herein by reference.

BACKGROUND

The ability to develop flexible custom applications on a remote terminal unit (RTU) platform requires developer or systems integrator access to developer features, often at operating system root level. Such access could be used to compromise the operational integrity of the RTU device which may be operating to control a critical infrastructure asset. Tightly securing access to privileged functionality is necessary for run-time integrity, yet such privileged access is required to develop and deploy content. Software-only controls to switch between run-time and privileged modes may be insufficient from a cybersecurity and reliability perspective.

SUMMARY

Aspects of the present disclosure provide a combination hardware and operating system mechanism for securing access to privileged functionality in developer mode and preventing access to privileged functionality in run-time mode of a remote terminal unit (RTU).

The RTU embodying aspects of the present disclosure provides a hardware selector for privileged mode activation and deployment of integrator certificates. This feature requires local physical access to the device and cannot be activated remotely. In addition, the RTU embodying aspects of the present disclosure provides a read-only production filesystem for Linux run-time which cannot be modified but works in conjunction with an overlay filesystem architecture for extending content.

In an aspect, a method for conveniently and securely moving between operational modes on an RTU includes assigning a first state of a local mode selector to a run-time operational mode of the RTU and assigning a second state different than the first state to a privileged operational mode of the RTU. In response to the mode selector being caused to physically move from the first state to the second state, the method includes deactivating the run-time operational mode of the RTU and activating the privileged operational mode of the RTU. The method also includes performing one or more functionalities associated with the privileged operational mode via a computing device communicatively coupled to the RTU and, subsequent to performing the one or more functionalities associated with the privileged operational mode, causing the mode selector of the RTU to physically move from the second state assigned to the privileged operational mode to the first state assigned to the run-time operational mode to deactivate the privileged operational mode and activate the run-time operational mode of the RTU.

In another aspect, a system includes an RTU including a local mode selector local and a computing device communicatively coupled to the RTU. The mode selector has a first state associated with a run-time operational mode of the RTU and a second state different than the first state associated with a privileged operational mode of the RTU. In response to the mode selector being caused to physically move from the first state to the second state, the run-time operational mode of the RTU is deactivated and the privileged operational mode of the RTU is activated. The computing device is configured to perform one or more functionalities associated with the privileged operational mode. Subsequent to performing the one or more functionalities associated with the privileged operational mode, the mode selector of the RTU is caused to physically move from the second state assigned to the privileged operational mode to the first state assigned to the run-time operational mode to deactivate the privileged operational mode and activate the run-time operational mode of the RTU.

Other objects and features of the present disclosure will be in part apparent and in part pointed out herein.

BRIEF DESCRIPTION OF THE DRAWINGS

Corresponding reference numbers indicate corresponding parts throughout the drawings.

DETAILED DESCRIPTION

Figure 1:
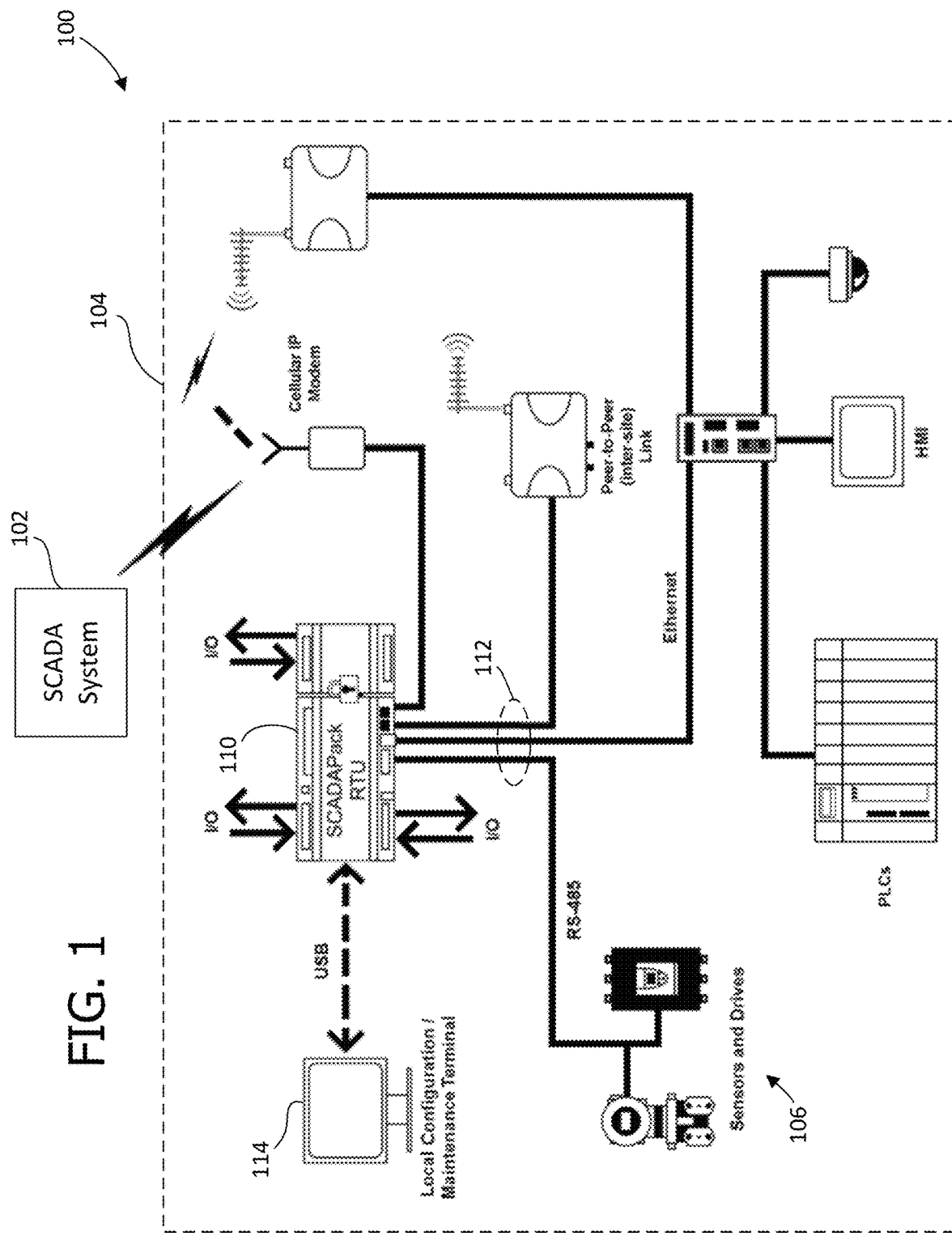
FIG. 1 illustrates a remote terminal unit (RTU) substation of an automation system according to an embodiment.

Referring to FIG. 1, a schematic overview of an automation system is shown 100. In the illustrated embodiment, the automation system 100 includes a Supervisory Control and Data Acquisition (SCADA) system 102 coupled to a remote substation 104 via a communications network, such as a private data radio network and/or a cellular telephone network. The substation 104 includes a number of peripherals 106, including sensors, actuators, drives, and the like. The substation 104 further includes at least one remote terminal unit (RTU) 110 for data acquisition from the substation 104 and/or from the SCADA system 102. In an embodiment, the RTU 110 is used as a control device. A communication bus 112 provides communication for the complete substation 104 and all parts of the substation are accordingly connected thereto, whether directly or indirectly. The RTU 110 is configured to be connected to a computer 114 (e.g., a personal computer, desktop, laptop, workstation machine, etc.) to access and control settings and parameters as well as a real-time database.

The RTU 110 is well-suited for use in oil and gas environments, such as upstream oil and gas production, including gas well heads, oil extraction, and multi-well shale gas well pads. Additional customer use cases in the oil and gas segment include energy optimization, asset age prolongation, production optimization, and 'cradle-to-grave' operation with the same equipment to allow changes in extraction technique using the same control system equipment. Oil and gas segment use cases also include: management of control system and IT equipment, including security configurations, and deployment of trusted application content; and midstream gas transportation including compressor stations and multiple geographies. The functions of RTU 110 in an oil and gas application include: tank monitoring and automation; well test automation; Emergency Shut-Down (ESD) at well heads; well production and optimization; and measurement.

In an oil and gas environment, for example, substation 104 is located at a well site to gather data about various aspects of the well site for monitoring and tracking purposes. The substation 104, which acts as a control unit, includes RTU 110 for collecting data on pump motor operation (e.g., motor speed and load). A variable speed drive motor controller, for example, generates this motor data. The RTU 110 also collects measurements from various wireless and wired field sensors around the well site. These field sensors include a proximity sensor mounted near the crank arm of a rod pump assembly and a load cell mounted between the bridle and polished rod of the rod pump assembly. From this data, RTU 110 can determine the tension or load (vertical axis) on the rod versus the displacement (horizontal axis) of the rod per stroke or pump cycle (i.e., upward and downward movement). Other data collected by RTU 110 from the field sensors may include fluid flow rate, temperature, pressure, and the like.

In an embodiment, RTU 110 is also well-suited for use in the water/wastewater segment, including critical infrastructure pumping stations. Additional customer use cases in the water and wastewater segment include energy optimization for critical infrastructure pumping stations and management of control system and IT equipment including security configurations, and deployment of trusted application content. Examples of water and wastewater functions of RTU 110 include: pump/lift stations; leakage detection; equipment monitoring and control; water quality monitoring; irrigation; managing a District Metering Area (DMA) and/or Pressure Monitoring Area (PMS); and monitoring flow, level, pressure, temperature, etc.

Another use case for the RTU embodying aspects of the present disclosure involves autonomous, remotely located assets, including critical infrastructure assets, where high control system, monitoring, and reporting availability as well as data analytics associated with control systems, asset performance, and custom application features are requested.

Figure 2:
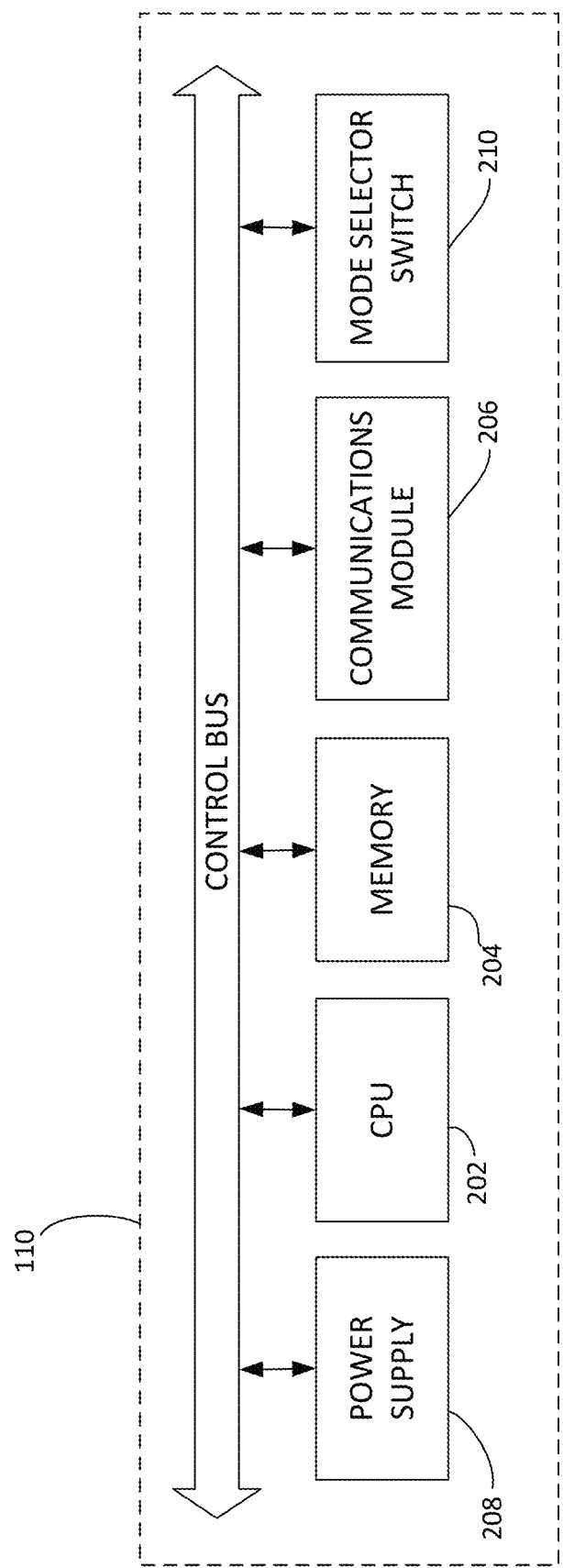
FIG. 2 is a block diagram of the RTU of FIG. 1.

FIG. 2 illustrates RTU 110, including its major components. As shown, RTU 110 includes a central processing unit (CPU) 202, which is the controller module of RTU 110. In addition, RTU 110 includes a memory 204 (e.g., volatile and non-volatile), and a communications module 206 all coupled to a power supply module 208. In an embodiment, the communications module 206 includes a serial port or onboard modem with an I/O (input/output) interface. The RTU 110 is configured to be interfaced to multiple control stations and intelligent electronic devices using different communication media such as RS485, RS232, Ethernet, microwave, satellite, etc. When a communication interface is established, either device can initiate the data transfer. In addition, RTU 110 may include one or more digital input modules providing a plurality of digital inputs, one or more digital output modules providing a plurality of digital outputs, one or more analog input modules providing a plurality of analog inputs, and one or more analog output modules providing a plurality of analog outputs.

As shown in FIG. 2, RTU 110 also includes a mode selector switch 210. In an embodiment, the mode selector 210 is connected to general purpose input/output lines on, for example, a Linux managed processor. Although referred to herein as a switch, it is to be understood that mode selector switch may be embodied by a number of devices, such as buttons, toggles, sliders, etc., which are local to RTU 110. Aspects of the present disclosure provide the mode selection information to the RTU platform, namely, the sub-system within the RTU 110 that supports the classical RTU components such as I/O management, object database management, IEC 61131-3 logic execution, event management, remote SCADA protocols, and device scanning using, for example, an embedded real-time operating system.

Figure 3:
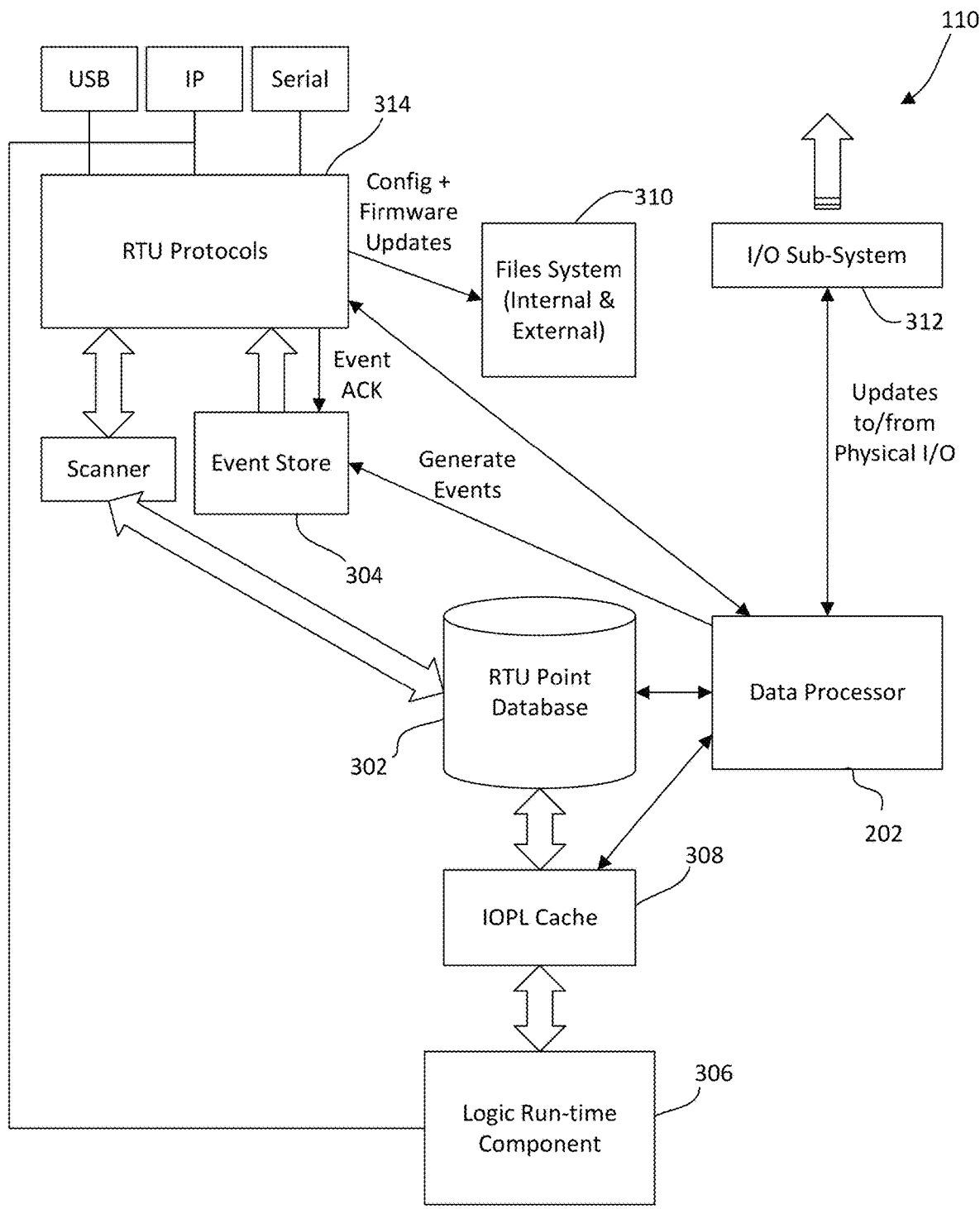
FIG. 3 is a block diagram illustrating an example internal architecture of the RTU of FIG. 1.

FIG. 3 illustrates aspects of an example internal architecture of RTU 110 according to an embodiment. The CPU 202, indicated in FIG. 3 as a data processor, is the central component by which changes to the status of RTU 110 are managed. The RTU 110 includes a point database 302, an event store 304, a logic run-time component 306, and a cache 308 of the IOPL (i.e., I/O process list, which copies instructions for logic run-time state and end-of-scan data transfers). In the illustrated embodiment, RTU 110 further includes a filesystem 310, an I/O sub-system 312, and a store of RTU protocols 314.

The CPU 202 is responsible for updating the point database 302 based on information from other parts of substation 104, including physical I/O updates from upstream remote protocols via the I/O sub-system 312, local or downstream device data, local run-time logic execution, etc. In an embodiment, the internal systems of RTU 110 manage event storage, with time-stamped data. Events are captured in the event store 304 based on an RTU configuration associated with physical I/O, downstream data sources, and internal data items (including data items coming from logic run-time 306). Events are reported upstream to client stations through remote protocols 314. Confirmation messages from upstream client stations remove successfully delivered events from the RTU event store 304. The filesystem 310 of the RTU 110 provides storage for delivery of data items such as full or incremental configuration, firmware upgrades, logic applications, etc.

In an embodiment, the ability to develop flexible custom applications on an RTU platform requires developer or integrator access to developer features, often at operating system root level. Such access could be used to compromise the operational integrity of RTU 110. Because RTU 110 may be operating to control a critical infrastructure asset, security is important. Tightly securing access to privileged functionality is necessary for run-time integrity, yet such privileged access is required to develop and deploy content. Software-only controls to switch between run-time and privileged modes may be insufficient from a cybersecurity and reliability perspective. For this reason, a combination of hardware and operating system methods is provided to switch between the modes.

The RTU 110 embodying aspects of the present disclosure provides a hardware selector, namely, mode selector switch 210, for privileged mode activation and deployment of integrator certificates. This feature requires local physical access to RTU 110 and cannot be activated remotely. In addition, RTU 110 embodying aspects of the present disclosure provides a read-only production filesystem for Linux run-time that cannot be modified but works in conjunction with an overlay filesystem architecture for extending content.

Aspects of the present disclosure provide a mechanism for securing access to privileged functionality in developer mode and preventing access to privileged functionality in run-time mode. A run-time (non-privileged) mode allows user to deploy application content locally or remotely, with content authenticated via local certificate. A locally selected privileged mode, using mode selector switch 210, allows the user to deploy an integrator's certificate via local access (via USB or RTU configuration tool). When not in the privileged mode, running services are dynamically restricted. The RTU 110 can be reverted to secure factory configuration, removing developer's overlay filesystem content and certificates, through a local boot mode. Firmware upgrades are validated for authenticity prior to allowing upgrade (locally or remotely). When the privileged mode is selected on RTU 110, the following services are enabled locally (and require physical presence at RTU 110 with content provided by a security administrator):

Load or update integrator security certificate or user security certificate;

Load or update signed boot-script (for activating user content that is authorized by a loaded security certificate); and Login to the operating system with root mode access.

In an embodiment, RTU 110 has an LCES2-based Edge Application platform board, including an integrated cellular modem option. The Edge Application platform is a subsystem within the RTU 110 that supports additional hardware interfaces (Ethernet, USB, microSD card, future integrated cellular modem) along with IoT Edge capabilities and user applications. It uses an embedded Linux operating system. The Mode selector switch 210 comprises a physical switch connected to the Edge Application platform.

TABLE I, below, illustrates an example of mode selector positions and corresponding RTU functions.

TABLE I

| Position | Mode | Comment |
| --- | --- | --- |
| 0 | LOCAL node | Applies to SP57x, SP47x, SP47xi models and SP470R in Non-Redundant mode |
| 1 | Distributed node | Applies to all SP47xi and SP470R models (SP470R in Non-Redundant mode) |
| 2 | | |
| 3 | # | |
| 4 | | |
| 5 | | |
| 6 | | |
| 7 | | |
| 8 | | |
| 9 | | |
| A | CPU-A | SP470R CPU-A Redundant Mode (SP470R only) |
| B | CPU-B | SP470R CPU-B Redundant Mode (SP470R only) |
| C | | Not defined - for possible user Edge platform application usage |
| D | | |
| E | | |
| F | Privileged mode | Privileged mode enabled for loading security certificates and privileged configuration onto the Edge platform |

In the above example, mode selections A and B are operational on one specific model of RTU 110 only. Mode selections C, D, E are available for Edge application user-defined modes. The selected mode is available through an internal system data reference. RTU Logic, remote protocols and Edge Applications have access to the mode selection setting. Mode selection F is defined for a privileged-security mode (for example, enabling Linux root account, for loading security certificates, and system maintenance purposes). In an alternative embodiment, mode selection F is defined as a LOCAL node with Privileged mode enabled (all models). In an embodiment, a change in the mode selector switch position results in the RTU platform and Edge Application platform rebooting.

Embodiments of the present disclosure may comprise a special purpose computer including a variety of computer hardware, as described in greater detail herein.

For purposes of illustration, programs and other executable program components may be shown as discrete blocks. It is recognized, however, that such programs and components reside at various times in different storage components of a computing device, and are executed by a data processor (s) of the device.

Although described in connection with an example computing system environment, embodiments of the aspects of the invention are operational with other special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the example operating environment. Examples of computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the present disclosure may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the present disclosure may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the invention.

Embodiments may be implemented with processor-executable instructions. The processor-executable instructions may be organized into one or more processor-executable components or modules on a tangible processor readable storage medium. Also, embodiments may be implemented with any number and organization of such components or modules. For example, aspects of the present disclosure are not limited to the specific processor-executable instructions or the specific components or modules illustrated in the figures and described herein. Other embodiments may include different processor-executable instructions or components having more or less functionality than illustrated and described herein.

The order of execution or performance of the operations in accordance with aspects of the present disclosure illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of the invention.

When introducing elements of the invention or embodiments thereof, the articles "a," "an," "the," and "said" are intended to mean that there are one or more of the elements.

The terms "comprising," "including," and "having" are intended to be inclusive and mean that there may be additional elements other than the listed elements.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively, or in addition, a component may be implemented by several components.

The above description illustrates embodiments by way of example and not by way of limitation. This description enables one skilled in the art to make and use aspects of the invention, and describes several embodiments, adaptations, variations, alternatives and uses of the aspects of the invention, including what is presently believed to be the best mode of carrying out the aspects of the invention. Additionally, it is to be understood that the aspects of the invention are not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

It will be apparent that modifications and variations are possible without departing from the scope of the invention defined in the appended claims. As various changes could be made in the above constructions and methods without departing from the scope of the invention, it is intended that all matter contained in the above description and shown in the accompanying drawings shall be interpreted as illustrative and not in a limiting sense.

In view of the above, it will be seen that several advantages of the aspects of the invention are achieved and other advantageous results attained.

The Abstract and Summary are provided to help the reader quickly ascertain the nature of the technical disclosure. They are submitted with the understanding that they will not be used to interpret or limit the scope or meaning of the claims. The Summary is provided to introduce a selection of concepts in simplified form that are further described in the Detailed Description. The Summary is not intended to identify key features or essential features of the claimed subject matter, nor is it intended to be used as an aid in determining the claimed subject matter.

The invention claimed is:

1. A method for selecting an operational mode on a remote terminal unit (RTU), comprising:

assigning a first state of a mode selector to a run-time operational mode of the RTU, wherein the mode selector is local to the RTU;

assigning a second state of the mode selector to a privileged operational mode of the RTU, wherein the second state is different than the first state;

in response to the mode selector being caused to physically move from the first state to the second state, deactivating the run-time operational mode of the RTU and activating the privileged operational mode of the RTU;

enabling, in the privileged operational mode, one or more functionalities associated with the privileged operational mode, wherein the functionalities associated with the privileged operational mode include deploying content to the RTU, and wherein authentication of the content by one or more integrator security certificates is required in the privileged operational mode;

subsequent to performing the one or more functionalities associated with the privileged operational mode, causing the mode selector of the RTU to physically move from the second state assigned to the privileged operational mode to the first state assigned to the run-time operational mode to deactivate the privileged operational mode and activate the run-time operational mode of the RTU;

preventing, in the run-time operational mode, access to the functionalities associated with the privileged operational mode; and enabling, in the run-time operational mode, one or more functionalities associated with the run-time operational mode, wherein the functionalities associated with the run-time operational mode include deploying the content to the RTU, and wherein authentication of the content by one or more local security certificates is permitted in the run-time operational mode.

2. The method of claim 1, wherein the computing device coupled to the RTU device is located at least one of locally and remotely from the RTU.

3. The method of claim 1, wherein the one or more functionalities associated with the privileged operational mode include at least one of developing and deploying the content to the RTU, loading the one or more integrator security certificates for the RTU, enabling a Linux root account access to the RTU, and performing system maintenance on the RTU.

4. The method of claim 1, wherein the content deployed to the RTU comprises application content, and wherein when the RTU is in the run-time operational mode, the application content is capable of being deployed locally or remotely, with the application content authenticated via the one or more local security certificates.

5. The method of claim 1, wherein when the RTU is in the run-time operational mode, the RTU is operating in a read-only production filesystem for run-time that cannot be modified.

6. The method of claim 5, wherein the read-only production filesystem is capable of working in conjunction with an overlay filesystem architecture for extending the content.

7. The method of claim 1, wherein there is a dynamic restriction of running services when the RTU is not in the privileged operational mode.

8. The method of claim 1, wherein the RTU is configured to operate in a plurality of other operational modes in addition to the privileged operational mode and the run-time operational mode, and further comprising assigning another state of the mode selector to at least one of the other operational modes of the RTU.

9. The method of claim 8, wherein at least one of the plurality of other operational modes is required to be selected locally using the mode selector, and at least one of the plurality of other operational modes is capable of being selected remotely.

10. The method of claim 9, wherein the mode selector has an associated state/position for each of the plurality of other operational modes required to be selected locally using the mode selector.

11. A system comprising:

a remote terminal unit (RTU) including a mode selector local thereto, the mode selector having a first state associated with a run-time operational mode of the RTU and a second state different than the first state associated with a privileged operational mode of the RTU, wherein in response to the mode selector being caused to physically move from the first state to the second state, the run-time operational mode of the RTU is deactivated and the privileged operational mode of the RTU is activated; and a computing device communicatively coupled to the RTU, the computing device configured to perform one or more functionalities associated with the privileged operational mode when the RTU is in the privileged operational mode, wherein the one or more functionalities associated with the privileged operational mode include deploying content to the RTU, and wherein authentication of the content by one or more integrator security certificates is required in the privileged operational mode;

wherein subsequent to performing the one or more functionalities associated with the privileged operational mode, the mode selector of the RTU is caused to physically move from the second state assigned to the privileged operational mode to the first state assigned to the run-time operational mode to deactivate the privileged operational mode and activate the run-time operational mode of the RTU, and wherein access to the one or more functionalities associated with the privileged operational mode is prevented and one or more functionalities associated with the run-time operational mode are enabled when the RTU is in the run-time operational mode, wherein the one or more functionalities associated with the run-time operational mode include deploying the content to the RTU, and wherein authentication of the content by one or more local security certificates is permitted in the run-time operational mode.

12. The system of claim 11, wherein the computing device coupled to the RTU device is located at least one of locally and remotely from the RTU.

13. The system of claim 11, wherein the one or more functionalities associated with the privileged operational mode include at least one of developing and deploying the content to the RTU, loading the one or more integrator security certificates for the RTU, enabling a Linux root account access to the RTU, and performing system maintenance on the RTU.

14. The system of claim 11, wherein the content deployed to the RTU comprises application content, and wherein when the RTU is in the run-time operational mode, the application content is capable of being deployed locally or remotely, with the application content authenticated via the one or more local security certificates.

15. The system of claim 11, wherein when the RTU is in the run-time operational mode, the RTU is operating in a read-only production filesystem for run-time that cannot be modified.

16. The system of claim 15, wherein the read-only production filesystem is capable of working in conjunction with an overlay filesystem architecture for extending the content.

17. The system of claim 11, wherein there is a dynamic restriction of running services when the RTU is not in the privileged operational mode.

18. The system of claim 11, wherein the RTU is configured to operate in a plurality of other operational modes in addition to the privileged operational mode and the run-time operational mode, and wherein at least one of the plurality of other operational modes is required to be selected locally using the mode selector, and at least one of the plurality of other operational modes is capable of being selected remotely.

* * * * *